United States Patent
Gellis et al.

(10) Patent No.: US 12,556,295 B2
(45) Date of Patent: Feb. 17, 2026

(54) TIMESTAMP CONTROL LOOP

(71) Applicant: Mellanox Technologies, Ltd., Yokneam (IL)

(72) Inventors: Yam Gellis, Tel-Aviv (IL); Oren Matus, Kfar Yehezkel (IL); Liron Mula, Hertzlia (IL); Natan Manevich, Nesher (IL); Hillel Chapman, Ramat HaShofet (IL); Dotan David Levi, Kiryat Motzkin (IL)

(73) Assignee: Mellanox Technologies, Ltd., Yokneam (IL)

( * ) Notice: Subject to any disclaimer, the term of this patent is extended or adjusted under 35 U.S.C. 154(b) by 346 days.

(21) Appl. No.: 18/229,074

(22) Filed: Aug. 1, 2023

(65) Prior Publication Data

US 2025/0047402 A1 Feb. 6, 2025

(51) Int. Cl.
*H04J 3/06* (2006.01)

(52) U.S. Cl.
CPC .................................. *H04J 3/0661* (2013.01)

(58) Field of Classification Search
None
See application file for complete search history.

(56) References Cited

U.S. PATENT DOCUMENTS

| | | | | |
|---|---|---|---|---|
| 6,690,683 B1 * | 2/2004 | Brunheroto | ............. | H04J 3/047 370/542 |
| 7,139,923 B1 * | 11/2006 | Chapman | ............. | H04N 21/242 713/400 |
| 8,325,704 B1 * | 12/2012 | Lemkin | ................. | H04J 3/0667 370/347 |
| 9,312,977 B1 * | 4/2016 | Khuu | ..................... | H04J 3/1694 |
| 2005/0163070 A1 * | 7/2005 | Farnham | ............. | H04W 52/265 370/328 |
| 2012/0263165 A1 * | 10/2012 | Zakrzewski | ........ | H04W 56/009 370/350 |
| 2017/0164387 A1 * | 6/2017 | Lou | ........................ | H04W 74/04 |
| 2017/0325120 A1 * | 11/2017 | Szilagyi | .............. | H04L 41/5067 |
| 2019/0289448 A1 * | 9/2019 | Simileysky | ........... | H04L 43/022 |
| 2019/0297584 A1 * | 9/2019 | Stauffer | ............... | H04B 17/336 |
| 2019/0394137 A1 * | 12/2019 | Zeng | ....................... | H04L 47/25 |
| 2021/0274472 A1 * | 9/2021 | Foti | ........................ | H04W 72/02 |
| 2022/0015133 A1 * | 1/2022 | Fong | ..................... | H04L 1/0061 |
| 2023/0026160 A1 * | 1/2023 | Khojastepour | ........ | H04W 64/00 |
| 2023/0269155 A1 * | 8/2023 | Van Parys | ........... | H04L 43/0829 |
| 2023/0344739 A1 * | 10/2023 | Peri | ........................ | H04L 43/067 |
| 2024/0085938 A1 * | 3/2024 | Abdelhameed | ........... | G06F 1/04 |
| 2025/0047402 A1 * | 2/2025 | Gellis | ........................ | G06F 1/14 |

* cited by examiner

*Primary Examiner* — Christopher T Wyllie
(74) *Attorney, Agent, or Firm* — Lowenstein Sandler LLP (57) ABSTRACT

A device includes a receiver including a timestamp generator to update timestamps at a first rate. The receiver is to estimate a first time for receiving a signal, wherein the signal is associated with a synchronization operation. The receiver is further to receive the signal at a second time. The receiver is further to determine a difference between the second time and the first time, wherein the difference is associated with an error of the timestamp generator of the receiver. The receiver can also adjust the first rate to a second rate at which to update the timestamps by the timestamp generator, responsive to determining the difference between the first time and the second time.

20 Claims, 6 Drawing Sheets

TIMESTAMP CONTROL LOOP

TECHNICAL FIELD

At least one embodiment pertains to processing resources used to perform and facilitate high-speed communications. For example, at least one embodiment pertains to technology for a timestamp control loop. For example, at least one embodiment relates to an agent (e.g., a receiving device) having a timestamp control loop to adjust an internal timestamp.

BACKGROUND

Communication systems can transmit signals from a first device to a second device using a communication protocol (e.g., Ethernet, wireless, cables, printed circuit boards, links, etc.) Communicating from a transmitter of the first device to a receiver of the second device results in the need for the receiver to be synchronous with the transmitter as data may otherwise be corrupted—e.g., the transmitter and receiver are time-synchronous (e.g., a clock at both devices is synchronized or occur at a same time) or the transmitter and the receiver are frequency-synchronous (e.g., a clock at both devices ticks at a same frequency). Some communication systems may attempt synchronization between devices using a precision time protocol (PTP) or other protocol that transmits timestamps—e.g., the communication system can perform synchronization between devices by transmitting a timestamp from a primary device to one or more connected agent devices. However, in some systems, sharing a timestamp source to many different target units in an integrated circuit and keeping the different target units synchronized between all of them is challenging. The signal that is shared could pass clock domain crossings, which have indeterministic delays, making it a challenge to keep the synchronization in units in different clock domains.

BRIEF DESCRIPTION OF DRAWINGS

Various embodiments in accordance with the present disclosure will be described with reference to the drawings, in which.

DETAILED DESCRIPTION

As described above, communication systems can transmit data between a first and second device using a communication protocol (e.g., Ethernet, wireless, cables, printed circuit boards, links, etc.) Communicating from a transmitter of the first device to a receiver of the second device results in the need for the receiver to be synchronous with the transmitter, as data may otherwise be corrupted. Some communication systems may attempt synchronization between devices using a precision time protocol (PTP) or other protocol that transmits timestamps—e.g., the communication system can perform synchronization between devices by transmitting a timestamp from a primary device to one or more connected agent devices. For example, the first device can transmit a timestamp at a constant rate to a second device—e.g., once every nanosecond, two nanoseconds, etc. This can enable the second device to receive the timestamps at the constant rate and adjust its internal clock accordingly. Some systems can also use timestamping to transmit time-sensitive packets or include timestamps to record or store when events occur in the system.

However, in some systems, each device can have a clock with a different domain. For example, a first device can have a clock with a first frequency, and a second device can have a clock with a second frequency. Transmitting signals in between the device can require an interface that translates between the different clock domains. But, the time it takes for a packet or timestamp to go from the first device to the second device can be indeterminate when signals are sent relatively frequent. For example, the first device can transmit signals according to a clock phase, but as the frequency is different than a clock of the second device, it can be impossible to tell when the signal will arrive—e.g., sometimes the signal can get there in a first time, and sometimes the signal can get there in a second time different than the first time. Accordingly, it can be difficult to synchronize the first device and second device (or otherwise transmit timestamps with accuracy).

Advantageously, aspects of the present disclosure can address the deficiencies above and other challenges by providing a system and a method for a timestamp control loop. For example, a receiving device (e.g., an agent) can include an internal timestamp control loop. In one embodiment, the agent can be programmed with an initial timestamp and increment rate based on a frequency of the agent—e.g., where the increment rate is a rate at which to update or adjust the timestamp should an error occur. The increment rate is the increment size for a cycle (1/frequency) in nanoseconds units and can be used not only when the error occurs. In some examples, a primary device (e.g., a transmitting device coupled with one or more agents) can include an accurate clock (e.g., a clock used to synchronize the agent devices). Accordingly, the agent can periodically receive a signal from the primary device, where the signals are transmitted at a relatively low frequency—e.g., over a determined average time. That is, the signals can be sent with enough in between them so that the signal is received at a constant rate—e.g., over a large enough time, an average time for a signal to be transmitted from the first device to the second device can be the same over multiple signal transmissions. The agent can use the internal timestamp loop to estimate a time a signal from the primary device should be received (e.g., a first time). In such examples, the agent can then receive the signal from the primary device at a second time and determine a difference between the second time and the first time—e.g., determine an error or drift between its internal estimation and when it actually receives a signal. If the agent device determines the error is greater than or less than zero, the agent device can increment or decrement its internal timestamp by a first value. In some examples, the agent can determine a first error having a first sign (e.g., a positive or negative sign), adjust its timestamp by the first value, and then determine a second error having a second sign different than the first—e.g., the agent can determine the error went from positive to negative or vice versa. In such embodiments, the agent can calculate a second value for incrementing or decrementing the internal timestamp, where the second value is a multiple of the first value and has a different sign than the first value. For example, the agent can initially increment the time by 0.01 nanoseconds when the second time is greater than the first time. In some examples, the agent can determine that the adjustments to the timestamp have caused the second time to be less than the first (e.g., the error goes from a positive value to a negative value). In such examples, the agent can multiply an accumulation of the first value by negative one-half (−½). For example, if the agent increments the time by 0.01 nanoseconds five (5) times before the sign changes (e.g., the second time goes to being greater than the first time to the second time is less than the first time), the agent can multiply 0.05 (e.g., 0.01 times the five times the error is accumulated) by the predetermined multiple or factor. In some embodiment, the multiple or factor can be one-half (½). Accordingly, the agent can decrement the increment rate by 0.025. In some examples, the agent can continue to reduce the increment or decrement rate and flip a sign of the increment or decrement rate each time the error rate crosses zero (e.g., goes from positive to negative or vice versa). Overtime, a slope of the error rate can decrease and approach zero.

Using a timestamp control loop, the agent can be synchronized with the primary device even if the agent and primary device clock domain are different. Additionally, enabling the agent to multiply the rate by a predetermined factor and flipping a sign of the increment rate each time the error crosses zero can enable the agent to reduce the error to zero over time. Accordingly, the primary device and agent device can be synchronous. This can enable the system to also determine times for events.

Figure 1:
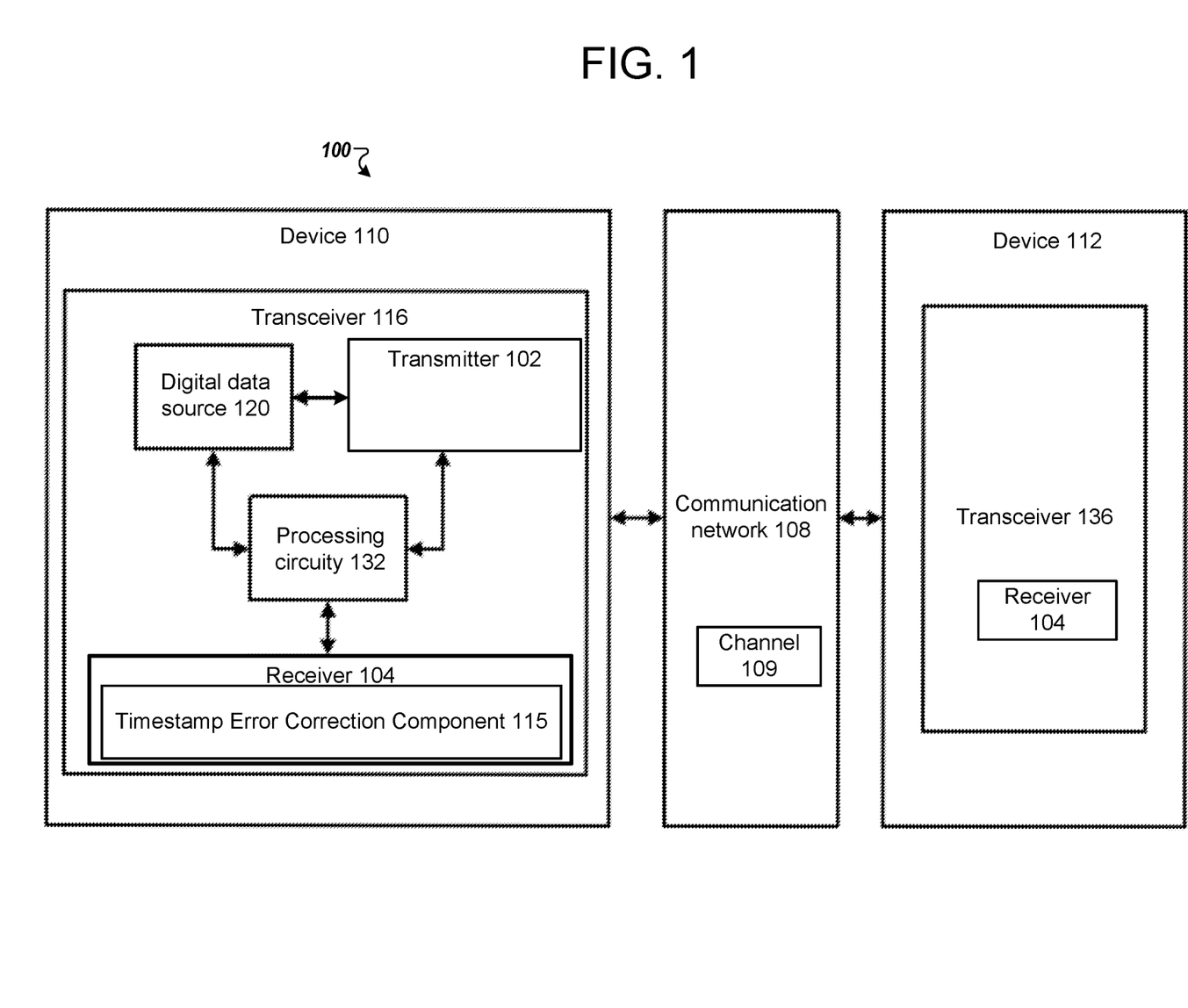
FIG. 1 is an example communication system, in accordance with at least some embodiments.

FIG. 1 illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU) or graphics processing unit (GPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 includes suitable software and/or hardware for receiving digital data from the digital data source 120 and outputting data signals according to the digital data for transmission over the communication network 108 to a receiver 104 of device 112. Additional details of the structure of the transmitter 102 are discussed in more detail below with reference to the figures.

The receiver 104 of devices 110 and 112 may include suitable hardware and/or software for receiving signals, such as data signals from the communication network 108. For example, the receiver 104 may include components for receiving processing signals to extract the data for storing in a memory, as described in detail below with respect to FIG. 2-FIG. 5. The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

In at least one embodiment, the receiver 104 can include a timestamp error correction component 115. In such embodiments, the timestamp error correction component 115 is to correct an error with an internal timestamp of a device as described with reference to FIGS. 2-5. In at least one embodiment, the timestamp error correction component 115 can estimate a time for receiving a signal from a second device (e.g., device 110 with a primary clock). In such embodiments, the timestamp error correction component 115 can receive the signal at a second time and determine a difference between the second time and the first time. If the timestamp error correction component 115 determines a difference between the second time and first time is non-zero, the timestamp error correction component 115 can adjust the rate for updating the timestamp as described with reference to FIGS. 2-5. In at least some embodiments, the timestamp error correction component 115 can determine a sign for the difference and a second sign for a previously determined difference. If the timestamp error correction component 115 determines the sign and the second sign are different, the timestamp error correction component 115 can adjust the first rate to a second rate, where the second rate is a factor of the first rate and has a different sign than the first rate, as described with reference to FIG. 3.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 136 may include other processing devices, storage devices, and/or communication interfaces generally associated with computing tasks, such as sending and receiving data.

Figure 2:
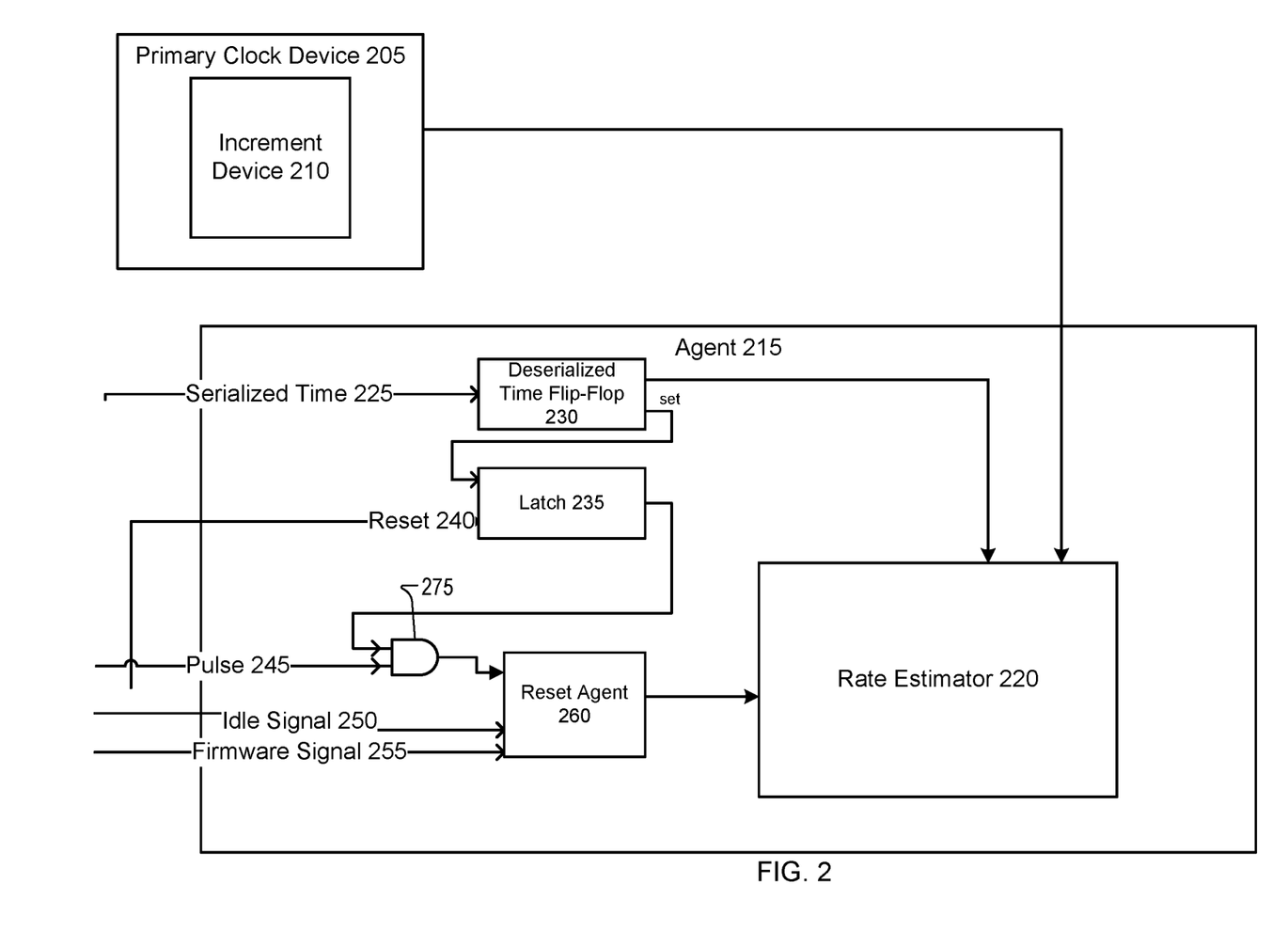
FIG. 2 illustrates an example communication system, in accordance with at least some embodiments.

FIG. 2 illustrates an example communication system 200. In at least one embodiment, the system 200 includes a primary clock device 205 and an agent 215. In at least one embodiment, the agent 215 includes a deserialized time flip-flop 230, a latch 235, a reset agent 260, and a rate estimator 220. In at least one embodiment, agent 215 can receive a serialized time 225, a reset signal 240, a pulse 245, an idle signal 250, and a firmware signal 255.

In at least one embodiment, primary clock device 205 can include a precision clock that agent 215 should be synchronized with—e.g., the agent 215 internal clock should be synchronized with the precision clock of the primary clock device 205. In at least one embodiment, the primary clock device 205 can transmit a repeating pulse to the agent 215 as described with reference to FIG. 3. In such embodiments, the agent 215 can update its internal clock and increment rate at the rate estimator 220. In at least one embodiment, the primary clock device can transmit the pulse at a constant rate to enable the agent 215 to calibrate its internal clock to the primary clock device 205 clock—e.g., the primary clock device can be a most accurate clock in the system 200 to which other components in the system 200 (e.g., the agent 215) are synchronized to. In some embodiments, the primary clock device 205 can transmit the pulse at a rate to avoid the signal being transmitted at an indeterminate time due to different clock domains between the primary clock device 205 and the agent 215. That is, although the primary clock device 205 and agent 215 can have a different clock domain (e.g., clocks with different frequencies), the primary clock device 205 can transmit signals over a long enough average time that the agent 215 can reliably receive the signal at a constant rate—e.g., because the primary clock device 205 is transmitting the signal to enable the agent 215 to calibrate its own internal timestamp generator rather than transmitting the signal to directly synchronize the agent 215 itself, the primary clock device 205 can transmit the signal at a slower rate.

In at least one embodiment, the primary device 205 also includes an increment device 210. In at least one embodiment, the increment device 210 determines or provides a rate at which to increment an internal timestamp generator—e.g., a rate at which to update timestamps internally at the primary clock device 205. In some embodiments, the increment device 210 of the primary clock device can be accurate within $2^{-48}$ nanoseconds—e.g., if the primary clock device 205 has a frequency of 600 megahertz (MHz), over a course of 24 hours, the total quantization error can be 0.18 nanoseconds (e.g., 24 hours*600 Mhz*$2^{-48}$).

In at least one embodiment, agent 215 can have an internal clock synchronized with the primary clock device 205. As described with reference to FIG. 3, the agent 215 can estimate a time at which to generate an internal timestamp and compare the estimation with the pulse received from the primary clock device 205 to calibrate its internal timestamp to be synchronized with the primary clock device 205. In some embodiments, the agent 215 can include components to reset the internal clock or internal rate estimator 220 of the agent 215. Additionally, the agent 215 can receive an initial time from the primary clock device 205—e.g., the primary clock device 205 can transmit an initialization value (e.g., serialized time 225) to the agent 215. For example, the agent can receive the serialized time 225 from the primary clock device 205 upon an initialization. In some embodiments, the agent 215 can receive the serialized time at the deserialized time flip-flop 230—e.g., the serialized time 225 can represent a string of bits that includes an offset from a real-world time (e.g., an offset from a Greenwich Mean Time (GMT)) that is deserialized and converted to a local time for the agent 215. In at least one embodiment, the agent 215 can transmit a set signal to latch 235 when receiving the serialized time 225. In such embodiments, the latch 235 can go high (e.g., output a '1') when a reset signal 240 is received at the latch 235. Accordingly, when a pulse 245 is received at gate 275 (e.g., an AND logic gate 275) along with a high signal from the latch 235, the reset agent 260 can receive a signal to reset a time for the rate estimator 220 (e.g., utilize the deserialized time determined from the serialized time 225). In other embodiments, the reset agent 260 can also indicate to the rate estimator 220 to reset the time when receiving an idle signal 250 (e.g., the agent 215 is in an idle mode and is reinitialized when exiting the idle mode) or when receiving a firmware signal 255—e.g., firmware of system 200 or the primary clock device 205 can also rest the time at the agent 215. In such embodiments, the agent 215 can be programmed or receive an initial time, enabling the agent 215 to begin calibrating its internal timestamp as described with reference to FIG. 3.

Figure 3:
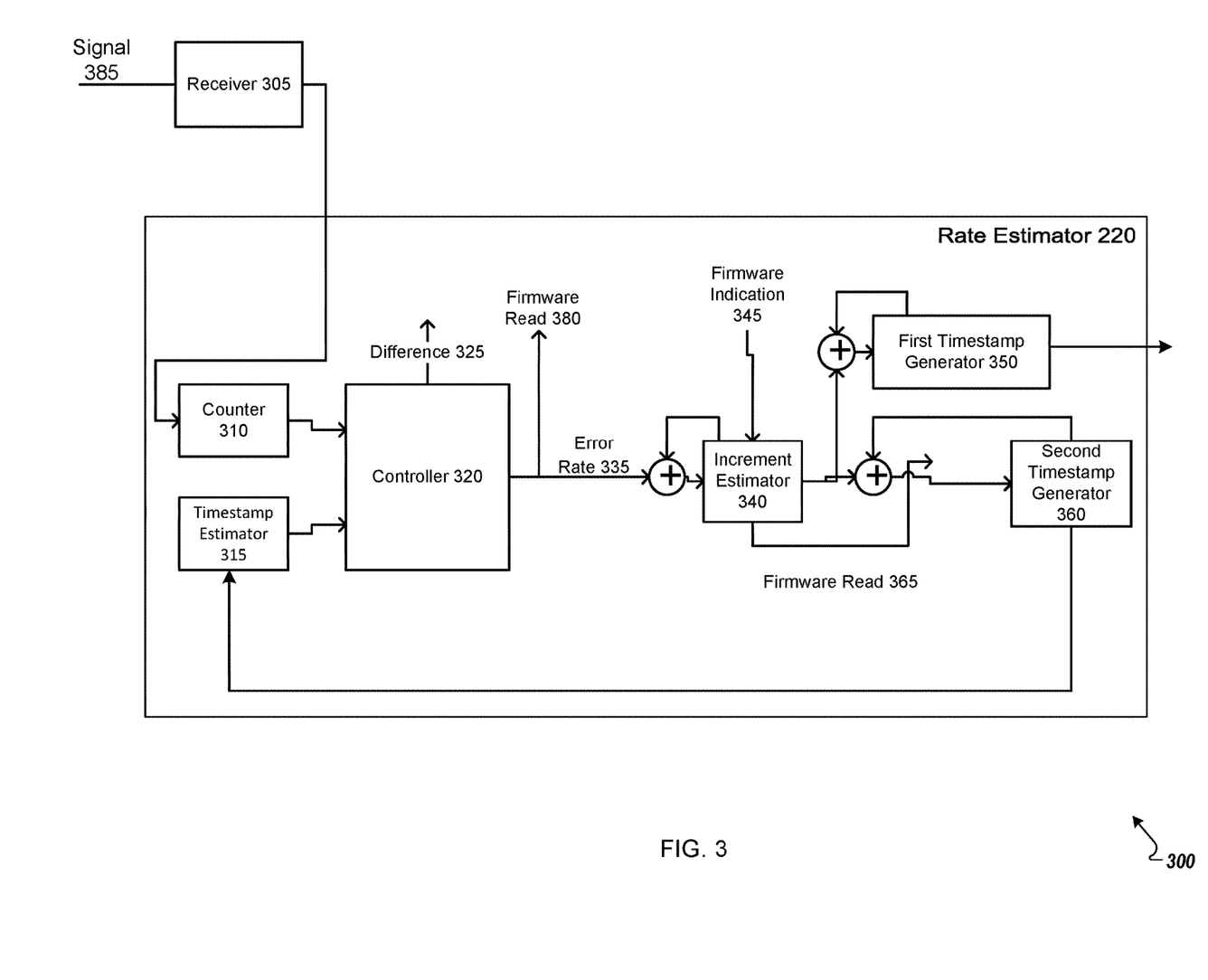
FIG. 3 illustrates an example agent device, in accordance with at least some embodiments.

FIG. 3 illustrates an example communication system 300 according to at least one example embodiment. In at least one embodiment, the system 300 can include a rate estimator 220 as described with reference to FIG. 2. Communication system 300 can also include a receiver 305. In at least one embodiment, the system 300 can be located entirely with agent 215 as described with reference to FIG. 2. In at least one embodiment, the rate estimator 220 includes a counter 310, a timestamp estimator 315, a controller 320, an increment estimator 340, a first timestamp generator 350, and a second timestamp generator 360. In at least one embodiment, the rate estimator 220 is to synchronize the agent 215 with a primary clock device (e.g., primary clock device 205 as described with reference to FIG. 2).

In one embodiment, the agent 215 is to receive a signal 385 at receiver 305. In at least one embodiment, the signal 385 is transmitted by the primary clock device 205. In some embodiments, the primary clock device 205 can transmit the signal 385 at a constant rate—e.g., according to an internal primary clock of the primary clock device. In some embodiments, the agent 215 can utilize the signal 385 being sent periodically to update or otherwise synchronize its internal clock with the primary clock device 205. For example, the rate estimator can receive the signal 385 at counter 310. In one embodiment, the rate estimator 220 can determine a time the signal 385 is received—e.g., the rate estimator can increment the counter 310 by one (1) each time a signal 385 is received and also record a time associated with incrementing the counter 310 by (1).

In at least one embodiment, the rate estimator 220 can include a first timestamp generator 350 and a second timestamp generator 360. In at least one embodiment, the first timestamp generator 350 and second timestamp generator 360 are to update timestamps at an incremental rate determined by the increment estimator 340—e.g., the increment estimator 340 can provide at a rate at which to update internal timestamps. In at least one embodiment, the rate estimator 220 can continually improve the incremental rate generated by the increment estimator 340, until an internal clock of the agent 215 is synchronized with the primary clock device 205. In at least one embodiment, the agent 215 is programmed with an initial increment rate based on a frequency of an agent 215 clock—e.g., the primary clock device 205 or a different component of system 200 as described with reference to FIG. 2 can program the agent 215 with an initial increment rate based on the clock frequency of the agent 215. In at least one embodiment, the increment rate at the increment estimator 340 can also be changed or otherwise set by a firmware indication 345—e.g., firmware of agent 215 can set an initial increment rate or set an increment rate during the operation of agent 215. In at least one embodiment, the firmware of agent 215 can also read the increment rate—e.g., a firmware read 365 as illustrated in FIG. 3.

In one embodiment, the second timestamp generator 360 can update a timestamp at the increment rate generated by increment estimator 340. In at least one embodiment, the second timestamp generator can also generate a timestamp in accordance with the increment rate and transmit the generated timestamp to timestamp estimator 315. In some embodiments, the second timestamp generator 360 can generate the timestamp according to a predetermined value, or each time the second timestamp generator 360 updates the timestamp internally—e.g., the second timestamp generator 360 can transmit the generated timestamp after a predetermined time (e.g., every 2 nanoseconds).

In at least one embodiment, the timestamp estimator 315 is to estimate when or at what time a signal 385 will be received at the agent 215. For example, the timestamp estimator 315 can periodically receive the generated timestamp from the second timestamp generator 360. In some embodiments, the timestamp estimator can transmit an indication to the controller 320 that the generated timestamp is received. In at least one embodiment, the indication transmitted by the timestamp estimator 315 is transmitted at a time the agent 215 estimates to receive the signal 385—e.g., the second timestamp generator 360 can generate and transmit timestamps to the timestamp estimator 315 based on the internal agent 215 increment rate.

In at least one embodiment, the controller 320 is to receive an output from the counter 310 and the timestamp estimator 315. In at least one embodiment, the counter 310 can output an actual time (e.g., T1) that a signal 385 is received—e.g., the counter 310 can increment when the signal 385 is received and transmit an indication to the controller 320 each time the counter 310 is incremented. In some embodiments, the timestamp estimator 315 can output an estimated time (e.g., E1) in accordance with the increment rate determined by the increment estimator 340—e.g., the timestamp estimator 315 can transmit an indication to the controller 320 corresponding to when the agent 215 predicts the signal 385 will be received. In some embodiments, the controller can determine a difference between the actual time and the estimated time—e.g., T1−E1. Accordingly, the controller 320 can determine if the internal clock is synchronized or if there is an error. For example, the controller 320 can determine there is no error if T1−E1 is equal to zero—e.g., the estimated time the signal is received is the same as an actual time the signal is received. In such embodiments, the controller 320 can determine that the internal clock of the agent is synchronized with the primary clock device 205.

In some embodiments, the controller 320 can determine that T1−E1 has a non-zero value—e.g., there is an error associated with the increment rate at which the second timestamp generator 360 updates the timestamp. In at least one embodiment, if T1−E1 is positive (e.g., T1 is larger than E1), the signal 385 may be received after an estimated time (e.g., the signal 385 is delayed compared with the estimated time). In some embodiments, if T1−E1 is negative (e.g., T1 is smaller than E1), the signal 385 may be received before an estimated time (e.g., the signal 385 is received before the estimated time). In either embodiment, the controller 320 can determine there is an error associated with updating the timestamp internally—e.g., there is an error associated with the increment rate.

In at least one embodiment, the controller 320 can adjust the increment rate associated with updating the timestamp when the controller 320 determines T1−E1 is non-zero. In at least one embodiment, the controller 320 can adjust the increment rate by error rate 335. In at least one embodiment, the error rate 335 is a configurable value set by firmware. For example, the controller 320 can adjust the increment rate by an error rate 335 if T1−E1 is non-zero. In some embodiments, the controller 320 can adjust the increment rate based on whether T1−E1 is positive or negative. For example, the agent 215 can have an initial increment rate of two (2) nanoseconds—e.g., the second timestamp generator 360 updates an internal timestamp every two nanoseconds. In some embodiments, an initial error rate 335 can be 0.01 nanoseconds. It should be noted that the numbers used here are examples only and not limiting on the claims. The increment rate and error rate 335 can be any value. In embodiments where the error rate is 0.01 nanoseconds, the controller 320 can adjust the increment rate by a positive 0.01 nanoseconds if T1−E1 is positive or adjust the increment rate by a negative 0.01 nanoseconds if T1−E1 is negative—e.g., the controller 320 can adjust the increment rate to 2.01 nanoseconds if T1−E1 is positive or adjust the increment rate to 1.99 nanoseconds if T1−E1 is negative. In at least one embodiment, the controller 320 can continue to adjust by 0.01 as long as T1−E1 maintains the same sign. For example, after adjusting the increment rate to 2.01 nanoseconds, the controller 320 can subsequently receive another estimated time and a time when the signal 385 is actually received—e.g., receive a second T1 and E1. In some embodiments, the controller 320 determines T1−E1 remains positive, and the controller 320 can adjust the increment rate by the error rate 335—e.g., adjust the increment rate to 2.02 nanoseconds. Similarly, in some embodiments, the controller 320 determines T1−E1 remains negative, the controller 320 can adjust the increment rate by the error rate 335—e.g., adjust the increment rate to 1.98 nanoseconds.

In some embodiments, the error rate 335 is based on an accumulation of errors. In at least one embodiment, the controller 320 can determine that a current T1-E1 has a sign different than a previously determined T1-E1. For example, the controller 320 can determine that T1-E1 is positive at a first time and adjust the increment rate by the error rate 335. In some embodiments, the controller 320 can then determine that T1-E1 is negative at a second time after adjusting the increment rate at the first time—e.g., the signal 385 can initially be received after the estimated time, but after the adjustment at the first time, the controller 320 can determine the signal 385 is received before the estimated time at the second time. In such embodiments, the controller 320 can determine that a second error rate based on an accumulation of adjustments since a last time the T1-E1 transitioned from negative to positive, where the second error rate is a factor of the initial error rate.

For example, the controller 320 can determine T1-E1 is positive and adjust the increment rate by the error rate 335 an "X" number of times before determining T1-E1 transitioned to a negative value. In such embodiments, the controller 320 can determine a second error rate that is equal to initial error rate*X*a predetermined factor*−1, where the initial rate*"X" is the total accumulated error. In some embodiments, the predetermined factor is a value less than one (1) set by the firmware of the system. For the sake of clarity, an example where the initial error rate is 0.01 and an initial increment rate is 2 nanoseconds is provided. For example, the controller 320 can determine T1-E1 is positive and adjust the increment rate ten (10) times before determining T1-E1 transitioned to a negative—e.g., an increment rate of 2.09 results in T1-E1 being positive, but an increment rate of 2.1 results in T1-E1 being negative. Accordingly, the total accumulation of adjustments (e.g., an accumulated error rate) since a previous sign change for T1-E1 is 0.1—e.g., 2.1-2. To determine the second error rate, the controller 320 can multiply the accumulated error by the predetermined factor (e.g., by one half). In such examples, the second error rate can be −0.05 (e.g., =*0.1*−1), where the error rate 335 is multiplied by negative one (−1) to account for T1-E1 transitioning from negative to positive or vice versa. In at least one embodiment, the controller 320 can continue adjusting the error rate 335 as described herein until T1-E1 is equal to zero-adjust the accumulated error rate by a predetermined factor*−1 each time T1-E1 goes from negative to positive or vice versa. In at least one embodiment, because the predetermined factor is less than one (e.g., is one half for example), the error between T1 and E1 continues to decrease over time—e.g., continues to approach zero (0). For example, the error rate can go from −0.05, to +0.025, to negative −0.0125 to +0.00625, etc., until it is zero. In at least one embodiment, the firmware can read either the difference 325 (e.g., T1-E1) or read the error rate 335 (e.g., perform a firmware read 380).

In at least one embodiment, the first timestamp generator 350 is to also update its internal timestamp by the increment rate. In at least one embodiment, the first timestamp generator 350 is to generate and output a timestamp to components external to the rate estimator 220—e.g., to other components of the agent 215. In at least one embodiment, the rate estimator 220 can include additional logic to compensate for a distance a component is from the rate estimator 220 when transmitting the timestamp generated by the first timestamp generator—e.g., compensate for a first component being further away than a second component receiving the timestamp from the timestamp generator.

Figure 4:
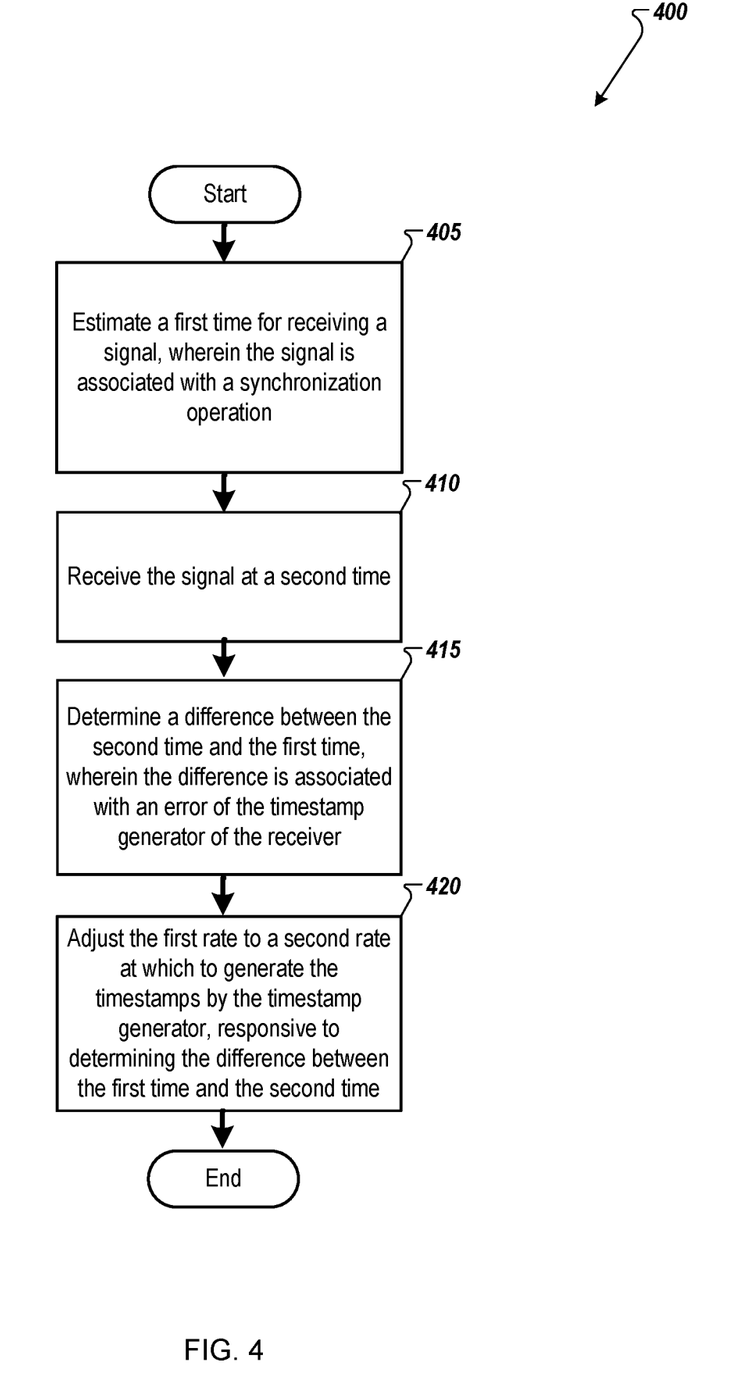
FIG. 4 is a flow diagram for a method of timestamp control loop, in accordance with at least some embodiments

FIG. 4 illustrates a flow diagram of a method 400 for a timestamp control loop based according to a least one example embodiment. The method 400 can be performed by processing logic comprising hardware, software, firmware, or any combination thereof. In at least one embodiment, the method 400 is performed by agent 215 and controller 320 as described with reference to FIGS. 2-3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments.

At operation 405, processing logic estimates a first time for receiving a signal, where the signal is associated with a synchronization operation. As described with reference to FIG. 3, the processing logic (e.g., agent 215) can update internal timestamps based on an increment rate. In some embodiments, the processing logic can generate a timestamp and transmit it to a controller, where the generated timestamp indicates when the agent 215 expects to receive a signal (e.g., signal 350).

At operation 410, processing logic can receive the signal at a second time—e.g., the processing logic can receive the signal 385 from the primary clock device 205 at the second time. In at least one embodiment, the signal is received at a constant rate from a second device including a primary clock (e.g., from the primary clock device 205 as described with reference to FIG. 2).

At operation 415, processing logic can determine a difference between the second time and the first time (e.g., determine T1-E1 as described with reference to FIG. 3), where the difference is associated with an error of the timestamp generator of the receiver. In some embodiments, the receiver can include a timestamp generator configured to update the timestamps at a first rate—e.g., the second timestamp generator and the increment rate as described with reference to FIG. 3. In one embodiment, the processing logic can determine the first time and the second time are equal (e.g., T1-E1 is zero) and refrain from adjusting the first rate responsive to determining the first time and the second time are the same.

At operation 420, processing logic can adjust the first rate to a second rate at which to update the timestamps by the timestamp generator responsive to determining the difference between the first time and the second time.

In at least one embodiment, the receiver can include a second timestamp generator (e.g., timestamp generator 350). In such embodiments, the timestamp generator is to estimate the first time (e.g., by transmitting a generated timestamp at the increment rate), and the second timestamp generator is to transmit a third time (e.g., a second generated timestamp) to one or more components of the device—e.g., to components external agent 215. In some embodiments, the third time is the same as the timestamp generated by the timestamp generator.

In at least one embodiment, the processing logic can estimate a third time for receiving a second signal, where the second signal is associated with the synchronization operation—e.g., the agent can receive a second signal from the primary clock device after updating its internal increment rate. In such embodiments, the processing logic can receive the signal at a fourth time and determine a second difference between the fourth time and the third time, where the second difference is associated with a second error of the timestamp generator.

In one embodiment, the processing logic can determine a first sign for the difference, where the first sign is positive or negative—e.g., determine whether T1−E1 is positive or negative. In at least one embodiment, the processing logic can also determine a second sign for the second difference, where the second sign is positive or negative. In one embodiment, the processing logic can determine the first sign is different than the second sign (e.g., that T1−E1 transitioned from positive to negative or vice versa). In such embodiments, the processing logic can determine the second rate at which to update the timestamps responsive to determining the first sign is different than the second sign, wherein the second rate is a multiple of the first rate and has a different sign than the first rate—e.g., the processing logic can multiply the first rate by a predetermined factor as described with reference to FIG. 3. In some embodiments, the processing logic can determine the first sign is the same as the second sign and determine the second rate at which to update the timestamps responsive to determining the first sign is the same as the second sign, wherein the second rate is the same as the first rate.

Figure 5:
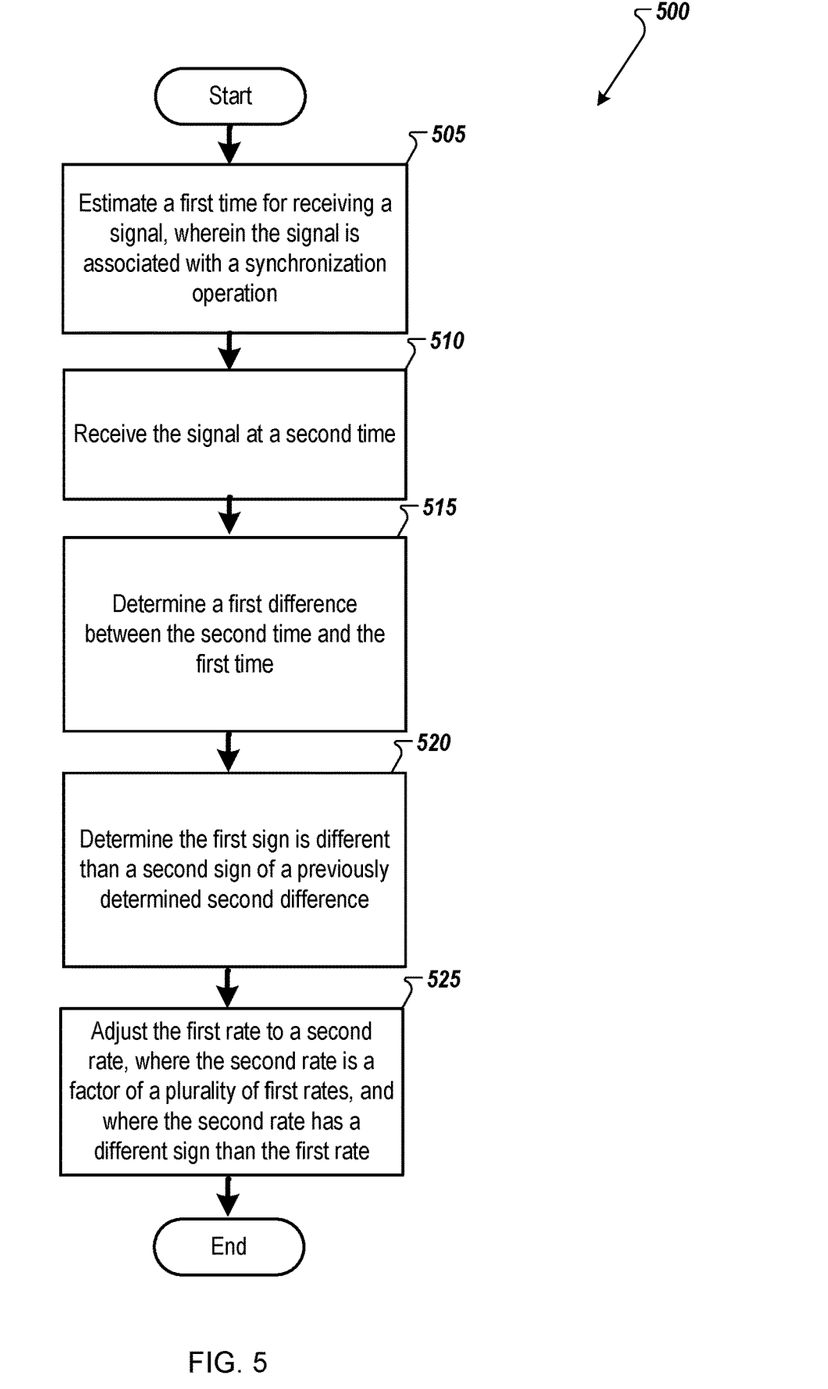
FIG. 5 illustrates a flow diagram of a method for a timestamp control loop based according to a least one example embodiment.

FIG. 5 illustrates a flow diagram of a method 500 for a timestamp control loop based according to a least one example embodiment. The method 500 can be performed by processing logic comprising hardware, software, firmware, or any combination thereof. In at least one embodiment, the method 400 is performed by agent 215 and controller 320 as described with reference to FIGS. 2-3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments.

At operation 505, processing logic estimates a first time for receiving a signal, wherein the signal is associated with a synchronization operation. In at least one embodiment, the processing logic is in a device comprising a receiver including a timestamp generator configured to update timestamps at a first rate. In at least one embodiment, the receiver is coupled with control logic (e.g., processing logic as described herein).

At operation 510, processing logic receives the signal at a second time—e.g., the processing logic can receive the signal 385 from the primary clock device 205 at the second time. In at least one embodiment, the signal is received at a constant rate from a second device including a primary clock (e.g., from the primary clock device 205 as described with reference to FIG. 2).

At operation 515, processing logic determines a first difference between the second time and the first time, where the first difference is associated with a first error at the timestamp generator and has a first sign (e.g., determine T1−E1 as described with reference to FIG. 3.

At operation 520, processing logic can determine the first sign is different than a second sign of a previously determined second difference, where the second difference is associated with a second error at the timestamp generator—e.g., the processing logic can determine T1−E1 transitioned from positive to negative or negative to positive as described with reference to FIG. 3.

At operation 525, processing logic can adjust the first rate to a second rate responsive to determining the first difference, where the second rate is a factor of a plurality of the first rates, and wherein the second rate has a different sign than the first rate. For example, the processing logic can multiply the first rate by a predetermined factor as described with reference to FIG. 3. In at least one embodiment, the plurality of first rates is an accumulation of one or more first rates during a time between the first sign being different than a previously determined third difference and the first sign being different than the second sign. That is, as described with reference to FIG. 3, the processing logic can adjust to the second error rate by determining first error rate*X*a predetermined factor*−1, where the initial rate*"X" is the total accumulated error—e.g., if the first error rate is 0.01 nanoseconds and the processing logic performs the correction ten (10) times, the total accumulated error is 10*0.01 or 0.1 nanoseconds.

In at least one embodiment, the receiver can include a second timestamp generator (e.g., timestamp generator 350). In such embodiments, the timestamp generator is to estimate the first time (e.g., by transmitting a generated timestamp at the increment rate), and the second timestamp generator is to transmit a third time (e.g., a second generated timestamp) to one or more components of the device—e.g., to components external agent 215. In some embodiments, the third time is the same as the timestamp generated by the timestamp generator.

As described with reference to FIG. 3, the processing logic can receive additional signals and continue to adjust the rate by the predetermined factor when T1−E1 transitions from negative to positive or vice versa. For example, the processing logic can estimate a third time for receiving a second signal, where the second signal is associated with the synchronization operation, receive the second signal at a fourth time, and determine a third difference between the fourth time and the third time, wherein the third difference is associated with a second error of the timestamp generator. In some embodiments, the third time and the fourth time are equal, and the processing logic can refrain from adjusting the first rate responsive to determining that the third time and the fourth time are equal. In other embodiments, the processing logic can determine a third sign for the third difference, determine that the third sign is the same as the first sign, and adjust the second rate to a third rate by a first amount—e.g., by error rate, as described with reference to FIG. 3. In at least one embodiment, the processing logic can estimate a fifth time for receiving the signal, receive the signal at a sixth time, determine a fourth difference between the sixth time and the fifth time, where the fourth difference is associated with a third error of the timestamp generator of the receiver, and adjust the third rate to a fourth rate by a second amount, wherein the second amount is equal to the first amount. In at least one embodiment, the processing logic can estimate a seventh time for receiving the third signal, receive the third signal at an eighth time, determine a fifth difference between the eighth time and the seventh time, and determine a fourth sign for the third difference and fifth sign for the fourth difference, where the fourth sign is different than the fifth sign. In at least one embodiment, the processing logic can adjust the fourth rate to a fifth rate responsive to determining the fourth difference, wherein the fifth rate is a factor of a sum of the first amount and the second amount, and wherein the fifth rate has a different sign than the fourth rate.

Figure 6:
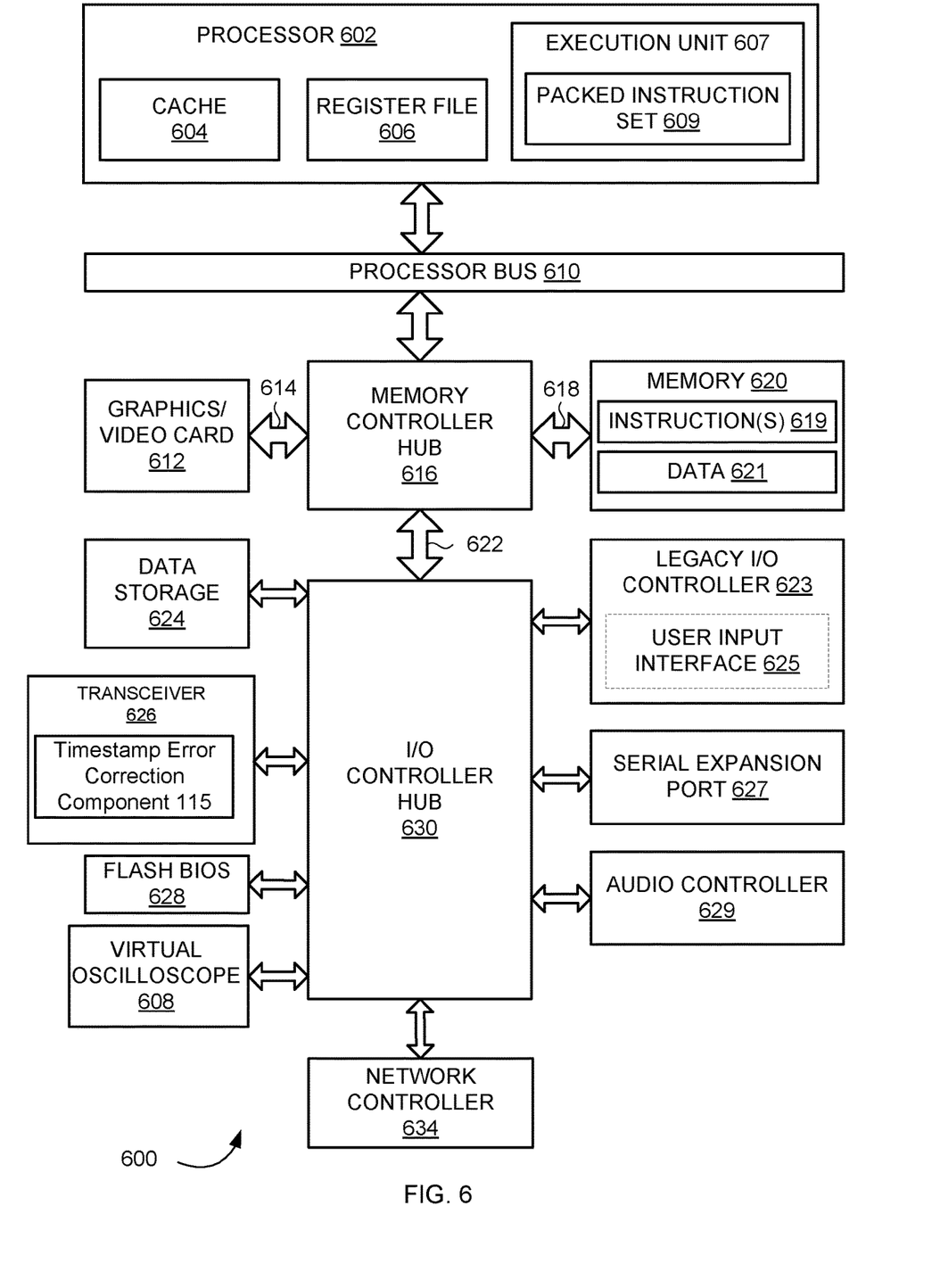
FIG. 6 illustrates an example computer system including a transceiver including a chip-to-chip interconnect, in accordance with at least some embodiments.

FIG. 6 illustrates a computer system 600 in accordance with at least one embodiment. In at least one embodiment, computer system 600 may be a system with interconnected devices and components, an SOC, or some combination. In at least one embodiment, computer system 600 is formed with a processor 602 that may include execution units to execute an instruction. In at least one embodiment, computer system 600 may include, without limitation, a component, such as a processor 602 to employ execution units including logic to perform algorithms for processing data. In at least one embodiment, computer system 600 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 600 may execute a version of WINDOWS' operating system available from Microsoft Corporation of Redmond, Wash., although other operating systems (UNIX and Linux, for example), embedded software, and/or graphical user interfaces, may also be used.

In at least one embodiment, computer system 600 may be used in other devices, such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphics processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 600 may include, without limitation, processor 602 that may include, without limitation, one or more execution units 607 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 600 is a single-processor desktop or server system. In at least one embodiment, computer system 600 may be a multiprocessor system. In at least one embodiment, processor 602 may include, without limitation, a CISC microprocessor, a RISC microprocessor, a VLIW microprocessor, a processor implementing a combination of instruction sets, or any other processor device, such as a digital signal processor, for example. In at least one embodiment, processor 602 may be coupled to a processor bus 610 that may transmit data signals between processor 602 and other components in computer system 600.

In at least one embodiment, processor 602 may include, without limitation, a Level 1 ("L1") internal cache memory ("cache") 604. In at least one embodiment, processor 602 may have a single internal cache or multiple levels of internal cache. In at least one embodiment, cache memory may reside external to processor 602. In at least one embodiment, processor 602 may also include a combination of both internal and external caches. In at least one embodiment, a register file 606 may store different types of data in various registers including, without limitation, integer registers, floating point registers, status registers, and instruction pointer registers.

In at least one embodiment, execution unit 607, including, without limitation, logic to perform integer and floating-point operations, also resides in processor 602. Processor 602 may also include a microcode ("ucode") read-only memory ("ROM") that stores microcode for certain macro instructions. In at least one embodiment, execution unit 607 may include logic to handle a packed instruction set 609. In at least one embodiment, by including packed instruction set 609 in an instruction set of a general-purpose processor 602, along with associated circuitry to execute instructions, operations used by many multimedia applications may be performed using packed data in a general-purpose processor 602. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 600 may include, without limitation, a memory 620. In at least one embodiment, memory 620 may be implemented as a DRAM device, an SRAM device, a flash memory device, or other memory devices. Memory 620 may store instruction(s) 619 and/or data 621 represented by data signals that may be executed by processor 602.

In at least one embodiment, a system logic chip may be coupled to processor bus 610 and memory 620. In at least one embodiment, the system logic chip may include, without limitation, a memory controller hub ("MCH") 616, and processor 602 may communicate with MCH 616 via processor bus 610. In at least one embodiment, MCH 616 may provide a high bandwidth memory path 618 to memory 620 for instruction and data storage and for storage of graphics commands, data and textures. In at least one embodiment, MCH 616 may direct data signals between processor 602, memory 620, and other components in computer system 600 and to bridge data signals between processor bus 610, memory 620, and a system I/O 622. In at least one embodiment, a system logic chip may provide a graphics port for coupling to a graphics controller. In at least one embodiment, MCH 616 may be coupled to memory 620 through a high bandwidth memory path 618, and graphics/video card 612 may be coupled to MCH 616 through an Accelerated Graphics Port ("AGP") interconnect 614.

In at least one embodiment, computer system 600 may use system I/O 622 that is a proprietary hub interface bus to couple MCH 616 to I/O controller hub ("ICH") 630. In at least one embodiment, ICH 630 may provide direct connections to some I/O devices via a local I/O bus. In at least one embodiment, a local I/O bus may include, without limitation, a high-speed I/O bus for connecting peripherals to memory 620, a chipset, and a processor 602. Examples may include, without limitation, an audio controller 629, a firmware hub ("flash BIOS") 628, a transceiver 626, a data storage 624, a legacy I/O controller 623 containing a user input interface 625 and a keyboard interface, a serial expansion port 627, such as a USB, and a network controller 634. Data storage 624 may comprise a hard disk drive, a floppy disk drive, a CD-ROM device, a flash memory device, or other mass storage devices.

In at least one embodiment, FIG. 8 illustrates a system that includes interconnected hardware devices or "chips" in a transceiver 826—e.g., the transceiver 826 includes a chip-to-chip interconnect including the first device 110 and second device 112 as described with reference to FIG. 1). In at least one embodiment, FIG. 8 may illustrate an exemplary SoC. In at least one embodiment, devices illustrated in FIG. 8 may be interconnected with proprietary interconnects, standardized interconnects (e.g., PCIe), or some combination thereof and utilize a GRS link. In at least one embodiment, one or more components of system 800 are interconnected using compute express link ("CXL") interconnects. In an embodiment, the transceiver 826 can include a timestamp error correction component 115 as described with reference to FIG. 1. In such embodiments, the timestamp error correction component 115 is to correct an error with an internal timestamp of a device as described with reference to FIGS. 2-5. In at least one embodiment, the timestamp error correction component 115 can estimate a time for receiving a signal from a second device (e.g., a device with a primary clock). In such embodiments, the timestamp error correction component 115 can receive the signal at a second time and determine a difference between the second time and the first time. If the timestamp error correction component 115 determines a difference between the second time and first time is non-zero, the timestamp error correction component 115 can adjust the rate for updating the timestamp as described with reference to FIGS. 2-5.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on the circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A device comprising:
    a receiver comprising a timestamp generator configured to update timestamps at a first rate, the receiver to:
        estimate a first time for receiving a signal, wherein the signal is associated with a synchronization operation;
        receive the signal at a second time;
        determine a difference between the second time and the first time, wherein the difference is associated with an error of the timestamp generator of the receiver; and
        adjust the first rate to a second rate at which to update the timestamps by the timestamp generator, responsive to determining the difference between the first time and the second time.

2. The device of claim 1, wherein the signal is received at a constant rate from a second device comprising a primary clock.

3. The device of claim 1, wherein the device comprises a second timestamp generator, and wherein:
    the timestamp generator is configured to estimate the first time; and
    the second timestamp generator is configured to transmit a third time to one or more components of the device.

4. The device of claim 1, wherein the receiver is further to:
    determine that the first time and the second time are equal; and
    refrain from adjusting the first rate responsive to determining that the first time and the second time are equal.

5. The device of claim 1, wherein the receiver is further to:
    estimate a third time for receiving a second signal, wherein the second signal is associated with the synchronization operation;
    receive the second signal at a fourth time; and
    determine a second difference between the fourth time and the third time, wherein the second difference is associated with a second error of the timestamp generator.

6. The device of claim 5, wherein the receiver is further to:
    determine a first sign for the difference, wherein the first sign is positive or negative; and
    determine a second sign for the second difference, wherein the second sign is positive or negative.

7. The device of claim 6, wherein the receiver is further to:
    determine the first sign is different than the second sign; and
    determine the second rate at which to update the timestamps responsive to determining the first sign is different than the second sign, wherein the second rate is a multiple of the first rate and has a different sign than the first rate.

8. The device of claim 6, wherein the receiver is further to:
determine the first sign is the same as the second sign; and
determine the second rate at which to update the timestamps responsive to determining the first sign is the same as the second sign, wherein the second rate is the same as the first rate.

9. A device comprising:
a receiver comprising a timestamp generator configured to update timestamps at a first rate, the receiver coupled with control logic to:
estimate a first time for receiving a signal, wherein the signal is associated with a synchronization operation;
receive the signal at a second time;
determine a first difference between the second time and the first time, wherein the first difference is associated with a first error at the timestamp generator and has a first sign;
determine the first sign is different than a second sign of a previously determined second difference, wherein the second difference is associated with a second error at the timestamp generator; and
adjust the first rate to a second rate responsive to determining the first difference, wherein the second rate is a factor of a plurality of the first rates, and wherein the second rate has a different sign than the first rate.

10. The device of claim 9, wherein the plurality of the first rates is an accumulation of one or more first rates during a time between the first sign being different than a previously determined third difference and the first sign being different than the second sign.

11. The device of claim 9, wherein the signal is received at a constant rate from a second device comprising a primary clock.

12. The device of claim 9, wherein the receiver comprises a second timestamp generator, and wherein:
the timestamp generator is configured to estimate the first time; and
the second timestamp generator is configured to transmit a third time to one or more components of the device.

13. The device of claim 9, wherein the receiver is further to:
estimate a third time for receiving a second signal, wherein the second signal is associated with the synchronization operation;
receive the second signal at a fourth time; and
determine a third difference between the fourth time and the third time, wherein the third difference is associated with a second error of the timestamp generator.

14. The device of claim 13, wherein the receiver is further to:
determine that the third time and the fourth time are equal; and
refrain from adjusting the first rate responsive to determining that the third time and the fourth time are equal.

15. The device of claim 13, wherein the receiver is further to:
determine a third sign for the third difference;
determine the third sign is the same as the first sign; and
adjust the second rate to a third rate by a first amount.

16. The device of claim 15, wherein the receiver is further to:
estimate a fifth time for receiving the signal;
receive the signal at a sixth time;
determine a fourth difference between the sixth time and the fifth time, wherein the fourth difference is associated with a third error of the timestamp generator of the receiver; and
adjust the third rate to a fourth rate by a second amount, wherein the second amount is equal to the first amount.

17. The device of claim 16, wherein the receiver is further to:
estimate a seventh time for receiving a third signal;
receive the third signal at an eighth time;
determine a fifth difference between the eighth time and the seventh time; and
determine a fourth sign for the fifth difference and a fifth sign for the fourth difference, wherein the fourth sign is different than the fifth sign.

18. The device of claim 17, wherein the receiver is further to:
adjust the fourth rate to a fifth rate responsive to determining the fourth difference, wherein the fifth rate is a factor of a sum of the first amount and the second amount, and wherein the fifth rate has a different sign than the fourth rate.

19. A method comprising:
estimating a first time for receiving a signal at a receiver comprising a timestamp generator configured to update timestamps at a first rate, wherein the signal is associated with a synchronization operation;
receiving the signal at a second time;
determining a difference between the second time and the first time, wherein the difference is associated with an error of the timestamp generator of the receiver; and
adjusting the first rate to a second rate at which to update the timestamps by the timestamp generator, responsive to determining the difference between the first time and the second time.

20. The method of claim 19, wherein the signal is received at a constant rate from a second device comprising a primary clock.

* * * * *